United States Patent Office 3,089,063
Patented May 7, 1963

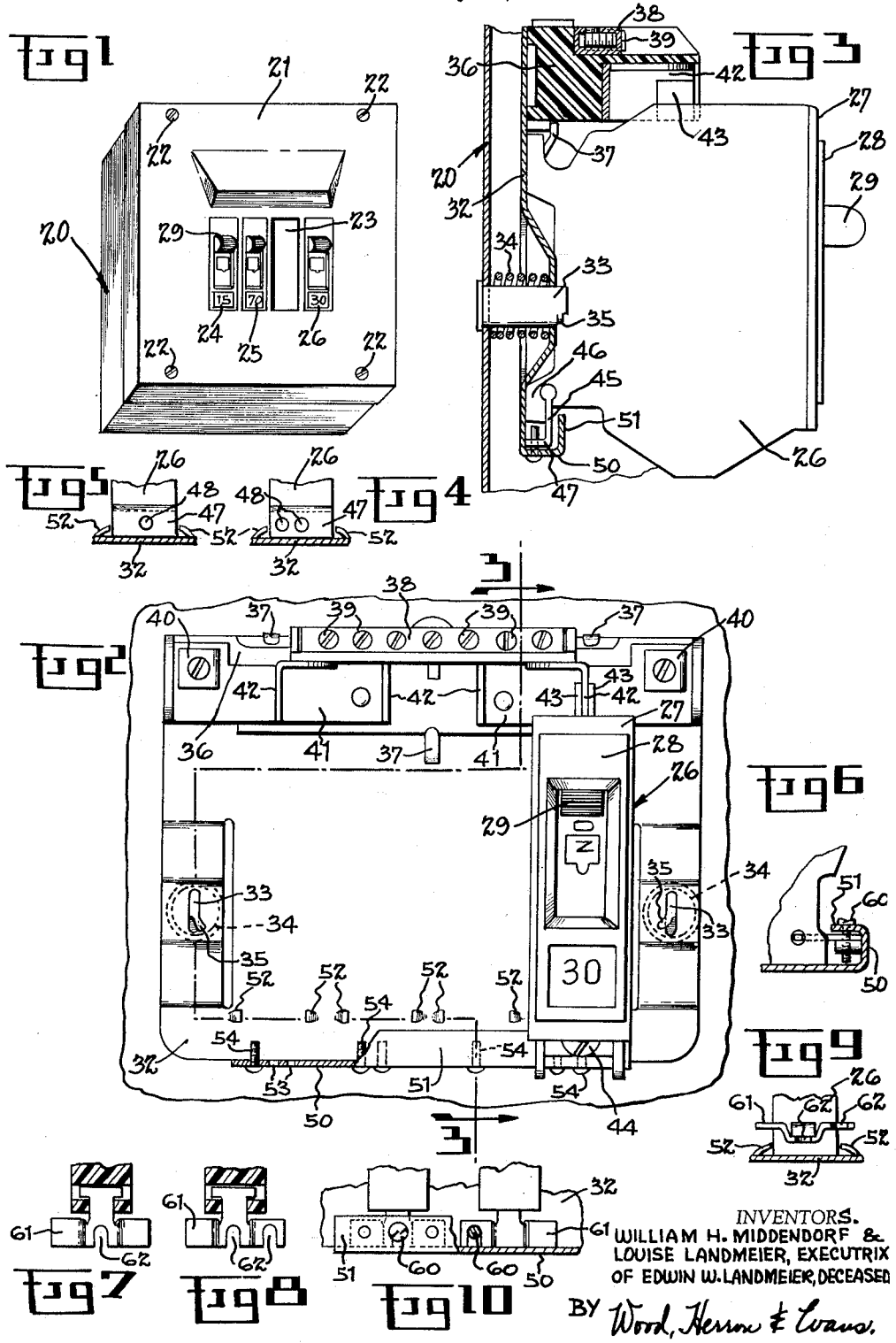

3,089,063
PANEL BOARD AND CIRCUIT BREAKER
COMBINATION
William H. Middendorf, Fort Wright, Ky., and Edwin W. Landmeier, deceased, late of Lakeside Park, Ky., by Louise Landmeier, executrix, Lakeside Park, Ky., assignors to Wadsworth Electric Manufacturing Company, Inc., Covington, Ky., a corporation of Kentucky
Filed May 27, 1958, Ser. No. 738,163
3 Claims. (Cl. 317—119)

This combination relates to a panel board and circuit breaker combination and more particularly to cooperating means on the circuit breaker and the panel board which substantially eliminates the possibility of installing a circuit breaker having a capacity greater than that originally installed.

Cooperating circuit breaker and panel board combinations of the type to which the invention is directed are disclosed in co-pending application, Serial No. 633,367, filed January 9, 1957, now Patent No. 2,916,675.

There is a continuing problem in circuit protection which the present invention in large measure obviates. Normally, an electrical installation is wired in accordance with the estimated and foreseeable future load and, at the load center, circuit interrupting devices are installed for the purpose of protecting the circuit components against extraordinary overload and, perhaps more important, for protecting the wiring against continuous overload.

In such installations from time to time new components adding to the total load requirement are installed and connected to existing wiring. After a time, it is found that the circuit breaker originally installed frequently interrupts the circuit. To avoid the necessity of having the installation rewired and a circuit breaker of higher capacity installed there is a tendency merely to install a circuit breaker with a higher rating in place of the original circuit breaker. This is indeed a dangerous practice for the larger capacity circuit breaker will permit the circuit wires to carry a load greater than that for which they were designed or will permit minor faults in the installed components to remain uncleared to the subsequent detriment of either the components, the wiring or both. Continuous overload on the wire could well be the cause of fire damage far in excess of the cost of rewiring when the increased load condition dictates.

It has been an objective of the invention to provide a circuit breaker and panel board combination in which it is impossible, through inadvertence, to substitute a circuit breaker having a capacity greater than that originally installed. Not only will the present invention avoid a dangerous substitution of a circuit breaker through inadvertence or carelessness but will reduce the likelihood of damage occurring through deliberate substitution of over capacity circuit breakers, for the deliberate substitution of an improper circuit breaker will render the panel board and circuit breaker combination obviously and visibly out of order to even the most cursory inspection.

It has been another objective of the invention to provide a panel board cooperable with one or more circuit breakers in which the panel board can be permanently prepared at the site of installation to receive only circuit breakers rated in accordance with the installed wiring and load conditions.

Thus the panel board is of universal application in that a standard panel board can be adapted to the precise circuit breaker installation determined at the site and time of installation.

It has been another objective of the invention to provide a circuit breaker and panel board combination in which the circuit breaker and panel board have cooperating members which determine the rating on the circuit breaker which may be installed. The member on the circuit breaker has one or more pin receiving sockets, that is holes or recesses, both the position and number of sockets being provided in accordance with the rating of the circuit breaker. The panel board mounted member has a plurality of pin positions. The installing electrician fixes pins or other forms of projections in one or more pin positions depending upon the wire used in the circuit being protected. The number of pins and their location correspond to the breaker socket locations and determine the maximum capacity of a circuit breaker which can be installed on the panel board.

It has been another objective of the invention to provide the circuit breaker and panel board combination described above in which portions of the panel board form a pocket surrounding the pin positions, the pocket receiving and confining against transverse movement that portion of the circuit breaker upon which the cooperating socket containing member is mounted. A portion of the pocket may be formed by projections struck from the metal plate which forms the panel board, the projections blocking lateral movement of the circuit breaker. This is an optional feature, for with proper design of breaker and panel board dimensions, each breaker must assume its proper position on the panel board or its cannot be located on the panel board at all. Additionally if one breaker is misaligned, adjacent breakers could not be properly mounted on the panel board, nor would the cover for the breakers fit. The pocket is completed by a flange on the panel mounted member which extends parallel to the plane of the panel board. The flange and projections insure that the circuit breaker can be installed on the panel board in only one position so that it is impossible to shift the circuit breaker sideways on installation thereby preventing the circuit breaker socket from receiving an improper panel board mounted pin.

As further insurance against improper installation, the panel board is mounted in an enclosure having a cover through which the upper surface of the circuit breaker projects. The cover is apertured to receive the upper surface of each circuit breaker, the apertures having a configuration matching that of the circuit breaker. Through the use of the cover as described above, improper installation of the circuit breaker at the load center is easily detected. If means other than a circuit breaker is used; for example, a copper wire, the required circuit breaker will not appear in the cover aperture. If the circuit breaker is connected at one end to the bus but is not located properly in the panel board pocket as it is supposed to be, the cover will not sit properly on the enclosure and the impropriety will again be readily detectable.

It has been still another objective of the invention to provide a panel board mounted in a box with pins mounted on the panel board so as to be substantially irremovable. The objective has been accomplished in large measure by so locating the pins with respect to the surrounding panel board structure that no tools can engage the pins to apply sufficient force for removal, and by using self tapping irreversible threaded pins.

These and other objectives of the invention will become more readily apparent from the following detailed description taken in conjunction with the drawings in which:

FIG. 1 is a perspective view of a load center constructed in accordance with the present invention;

FIG. 2 is a top plan view of the panel board having one circuit breaker mounted thereon in accordance with the present invention;

FIG. 3 is a cross-sectional view taken along lines 3—3 of FIG. 2;

FIGS. 4 and 5 are fragmentary views partly in section showing the circuit breaker mounted member cooperating with the panel board;

FIG. 6 is a fragmentary cross-sectional view showing an alternative form of the invention;

FIGS. 7 and 8 are fragmentary views partly in section showing the circuit breaker mounted member in the form of the invention shown in FIG. 6;

FIG. 9 is an end elevational view of the member of FIG. 8, and

FIG. 10 is a fragmentary top plan view showing the cooperating panel board and circuit breaker members of the form of the invention shown in FIG. 6.

A load center constructed in accordance with the present invention is illustrated in FIG. 1 and comprises a box like enclosure 20 having a cover 21 secured thereto by screws 22.

The cover is provided with one or more knockouts as at 23 which can be removed to present rectangular apertures through which the upper surface of circuit breakers 24, 25 and 26 project. As illustrated in FIGS. 2 and 3 each circuit breaker has a shoulder 27 above which a thin projection 28 and operating handle 29 projects. When the circuit breakers are properly seated within the enclosure 20 and cover 21 is in the proper position, the projection 28 extends through the rectangular aperture so that the upper surface thereof is substantially flush with the outer surface of cover 21.

Within the enclosure 20 is a panel board 32 formed by a metal plate. This plate may be mounted in any suitable manner, rigid or yieldable, in the enclosure 20. For example, in the illustrated form the plate is slidably mounted on posts 33 and is supported by a compression spring 34 on each side of the panel board. The top of the post 33 is bent slightly as at 35 to prevent the panel board from sliding off the top of the posts.

An insulating bus mount 36 is secured to the plate 32 by clamp members 37 struck from the plate 32. A ground bus terminal 38 is fixed to the rear of the bus mount 36 and is provided with screws 39 for securing ground connections in the circuit.

A pair of line terminals 40 integral with the line buses 41 are mounted on the insulating mount 36. Spaced terminal blades 42 project from the line bus 41 at a plurality of locations to receive the circuit breakers. The circuit breaker 26 is connected to the blade 42 by means of jaws 43 which frictionally embrace the blade in known manner. Connection to the other side of the circuit breaker is made through a solderless connector 44 in known manner.

A rating determining member 45 is imbedded in the foot 46 of the circuit breaker case. In the embodiment of FIGS. 1 to 5 the member 45 has a flange 47 having one or more recesses in the form of holes 48. While in the embodiment shown there is a possibility of placing three holes on the flange portion 47, it is to be understood that greater or lesser number of apertured positions could be provided depending upon the particular desires and ratings of the manufacturer's line of breakers of a standard size.

Cooperating with the member 45 on the foot of the breaker is panel mounted member or bracket 50 which is an integral extension of the plate 32 and which has a flange 51 which overhangs the member 45 when the circuit breaker is in its proper position (FIG. 3).

As best illustrated in FIGS. 2, 4 and 5, pocket forming projections 52 are struck from the plate 32 to confine the foot 46 of the circuit breaker against lateral movement. The pocket which receives the foot 46 together with the rating determining member 45 is thus formed by a portion of the plate 32, the member 50 including the flange 51 and the projections 52.

The width of the member 45 is such that if an attempt is made to insert a breaker in an improper position, that is, inclined to the perpendicular position with respect to member 50, the over all length across the diagonal of the breaker would prevent the breaker from being squeezed in between the bus blade 42 and the member 50.

The member 50 has a plurality of projection or pin positions 53 corresponding to the possible recess locations on the circuit breakers. One or more projections which may be in the form of pins 54 are fixed in respective pin positions in accordance with a predetermined standard. For example, if the capacity of a circuit breaker should not exceed 30 amps, a standard might specify a pair of pins located as shown at the right side of FIG. 2. In accordance with the standards, the manufacturer would make no circuit breaker having a rating determining member 45 with two apertures located as shown unless that circuit breaker had a capacity of 30 amps or less.

The particular design of the pin 54 is important only in so far as it is irremovable once it has been installed in its pin position. As an alternative for a pin, the member 50 might, at the pin receiving positions, be cut so that the electrician could strike a pin from the member 50 to project toward the circuit breaker. The two important aspects of the pin positioning to be borne in mind are that the pin must be projectable at the time and site of the installation and must be substantially irremovable after once being projected.

Purely by way of example the following might be the specifications for pin positions for circuit breakers of a standard dimension.

```
15 amps ----------------------------------------●●●
20 amps ----------------------------------------●○●
30 amps ----------------------------------------●●○
40 amps ----------------------------------------○●●
50 amps ----------------------------------------●○○
55 amps ----------------------------------------○●○
70 amps ----------------------------------------○○●
```

NOTE.—Solid black ● indicates a projecting pin and a corresponding hole in the breaker. The circles ○ indicate no pins in the panel member and no holes in the breaker member.

The electrician, having wired the particular installation, knows the rating of the cable used and knows the approximate load requirement. If the load requirement is 20 amps on two lines, and 50 amps on a third line, he drives two irremovable pins in the places indicated for each of the circuit breakers controlling the 20 amp lines. At the 50 amp position, the electrician drives a single irremovable pin into the panel mounted member 50. With this pin arrangement it is impossible, as indicated by the diagram above, to install a circuit breaker having current carrying capacity greater than 20 amps as in the case of the two lines and greater than the 50 amps as indicated in the third line. It will be possible in some instances to install a circuit breaker of lower current capacity as in the case of the 15 amp breaker which has three holes in its rate determining member. This however will not be detrimental to the system and accordingly presents no problem.

The pins having been placed in position, the circuit breaker is installed by first sliding the foot 46 into the pocket formed by the flange 51 and (optionally) the struck elements 52. The jaws 43 are then forced over the blade 42 and the circuit breaker is in proper position. When the wiring is completed by connecting leads to the solderless connectors 44, the cover 21 can be placed on the enclosure 20. Prior to placing the cover on the enclosure, the knockouts 23 are forced out of those positions through which the circuit breakers are to project to leave apertures of substantially the same dimension as the projection 28 which extends above the shoulder on the circuit breaker.

The spring 34 and posts 33 mounting of the panel permits a slight shifting of the panel board to facilitate the alignment of the circuit breaker with the apertures of the cover. If there is substantial mis-alignment due to the installation of the circuit breaker of greater capacity than the installation is designed for, the circuit breakers will not seat properly in the apertures of the cover. The improper installation will therefore be readily apparent upon cursory inspection.

Frequently a position on the panel board has no breaker, as illustrated at 23 in FIG. 1 in order to provide a spare position for future circuits. In this position, it may be found desirable to add pins requiring a low capacity breaker to avoid possibility of installing a high capacity breaker and shifting the wiring of an overloaded circuit over to it.

An alternative form of the invention is illustrated in FIGS. 6 to 10. In this installation, pins 60 are disposed perpendicular to the plane of the panel board by fixing them in the flange 51.

Pin 60 is illustrative of that which can be used in either modification of the invention. The shank is screw threaded and the slot in the head is relieved of those portions normally engaged by a screw driver for unscrewing. The slot thereby permits the pin to be screwed into position but renders unscrewing the pin impossible.

Referring particularly to FIG. 3, it can be observed that difficulty of removing the pins is increased by the overhanging flange 51 which renders the pins substantially inaccessible to such tools as would be necessary for the removal of the pins. If the pins are completely irreversible, even if accessible, flange 51 would not be necessary for this purpose.

On the circuit breaker, the rating determining members 61 have recesses formed by slots 62 as illustrated in FIGS. 7 and 8. Other than the disposition of the pins and the shape of the recesses, the cooperating rating determining members function in the same manner as the combination of FIGS. 1 to 5.

The modification of FIGS. 6 to 10 has an additional advantage of being useful either in the combination of the invention, or in certain existing panel boards not necessarily equipped with pin means for preventing interchangeability. The existing panel boards to which reference is made are those which provide, for each breaker position, an upwardly extending tang having a cross-sectional configuration similar to the member 50, but having a width just sufficient to seat in a central depression in the foot of a circuit breaker. In the breaker of the present invention, the rating determining member 61 has a central depression which can receive such a tang on existing panel boards. Thus a manufacturer, by adopting the design of FIGS. 6 to 10 will not be required to carry an inventory of his prior breakers to fit existing panel boards, and an inventory of new breakers to fit the panel board of the present invention; rather, the breaker of FIGS. 6 to 10 will work equally well for either existing or new panel boards.

While the invention has been described with the pins mounted on the panel board member with the recesses mounted on the circuit breaker member, it should be well understood that for some applications it may be found desirable to reverse the design and mount pins on the circuit breaker with recesses formable in the panel member. Such a design would be within the scope of the invention.

It should also be understood that changes, within the scope of the invention, could be made in the breaker and panel board rating determining members. For example, it is not necessary that a separate member 45 be imbedded in the foot of the breaker, for the foot of the breaker itself could be molded or bored to form the pin receiving sockets.

In a general manner, while there has been disclosed in the above description, what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

What is claimed is:

1. A panel board and circuit breaker combination comprising a panel board,
    at least two circuit breakers mounted on said panel board and having identical casings and different current carrying capacities,
    identical means on each casing for receiving a rating determining member,
    rating determining members having substantially identical end portions, each end portion being irremovably secured in said respective receiving means and projecting from one end of each casing so as to be visible,
    said rating determining members each terminating in at least one recess positioned in said member in accordance with the capacity of said circuit breaker,
    said panel board having at least two circuit breaker receiving positions,
    a mounting bracket irremovably fixed on said panel board,
    said mounting bracket including at least one irremovable projection at each circuit breaker position, said projection being positioned in said bracket to engage the rating determining member on the respective circuit breaker mounted in that position with said projection received in said recess,
    whereby each circuit breaker is positioned on the panel board as determined by the coincidence of the location of the recess in the rating determining member and said bracket projection.

2. A panel board and circuit breaker combination comprising
    a panel board,
    at least two circuit breakers mounted on said panel board and having identical casings and different current carrying capacities,
    contact means exposed at one end of each casing for engaging a panel board contact,
    means on each casing for receiving a rating determining member,
    a rating determining member mounted in each said receiving means and projecting from the other end of each casing so as to be visible, said rating determining members each terminating in at least one recess positioned in said member in accordance with the capacity of said circuit breaker,
    said panel board having at least two circuit breaker receiving positions,
    a contact mounted on said panel board at each of said circuit breaker receiving positions in operative connection with said contact means on said casings,
    a mounting bracket irremovably fixed on said panel board and spaced from said contacts a distance to permit reception of said casings between said contacts and mounting bracket,
    said bracket receiving said rating determining members,
    a plurality of pin receiving apertures in said bracket at each circuit breaker receiving position,
    an irremovable pin mounted in those apertures corresponding to the recess positions on said respective rating determining members, whereby each circuit breaker is positioned on the panel board as determined by the coincidence of location of the slots in the rating determining member and said bracket pins.

3. A panel board and circuit breaker combination comprising,
    a panel board,
    at least two circuit breakers mounted on said panel board having identical casings and different current carrying capacities, contact means exposed at one end of each casing for engaging a panel board contact, identical means on each casing for receiving a rating determining member, rating determining members having substantially identical end portions each end portion being irremovably secured in said receiving means and projecting from the other end of each casing so as to be visible, each said rating determining member terminating in at least one recess positioned in said member in accordance with the capacity of said circuit breaker, said panel board having at least two circuit breaker receiving positions, a contact mounted on said panel board at each of said circuit breaker receiving positions in operative connection with said contact means on said casings, a mounting bracket irremovably fixed on said panel board and spaced from said contacts a distance to permit reception of said casings between said contacts and mounting bracket, said bracket receiving said rating determining members, at least three pin receiving apertures in said bracket at each circuit breaker receiving position, pins irremovably mounted in selected apertures corresponding to the rating of the circuit to be controlled by each said circuit breaker, whereby said panel board receives circuit breakers of only a preselected rating at each position on the panel board as determined by the coincidence of location of the recesses in rating determining member and said bracket pins.

References Cited in the file of this patent

UNITED STATES PATENTS

| | | |
|---|---|---|
| 2,281,958 | Snavely | May 5, 1942 |
| 2,766,405 | Edmunds | Oct. 9, 1956 |
| 2,733,386 | Myers | Jan. 31, 1956 |
| 2,790,113 | Brown | Apr. 23, 1957 |
| 2,837,699 | Fore | June 3, 1958 |
| 2,862,995 | Hercules | Dec. 2, 1958 |
| 2,910,630 | Hammerly | Oct. 27, 1959 |
| 2,883,587 | Dorfman | Apr. 21, 1959 |
| 2,928,998 | Brumfield | Mar. 15, 1960 |
| 2,946,928 | Slade | July 26, 1960 |
| 2,921,240 | Cole | Jan. 12, 1960 |
| 2,974,259 | Cole | Mar. 7, 1961 |

FOREIGN PATENTS

| | | |
|---|---|---|
| 342,220 | Germany | June 1, 1920 |
| 1,024,139 | Germany | Feb. 13, 1958 |

OTHER REFERENCES

Federal Noark Cat. 1000A, July 1953.